Aug. 8, 1939.                P. R. BETZING                2,168,759
                              ROD COUPLING
                          Filed Oct. 24, 1938
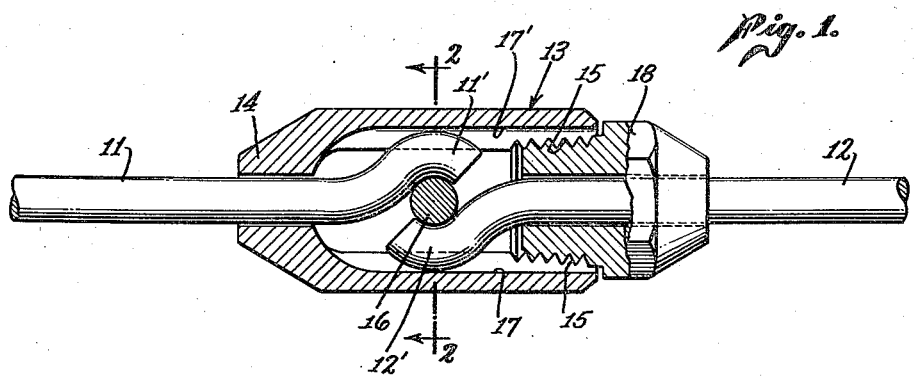
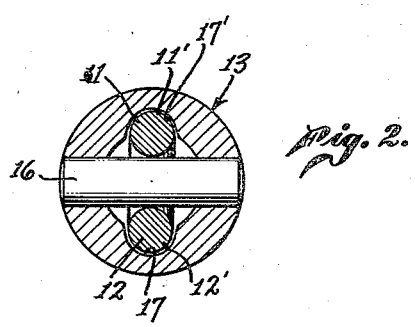
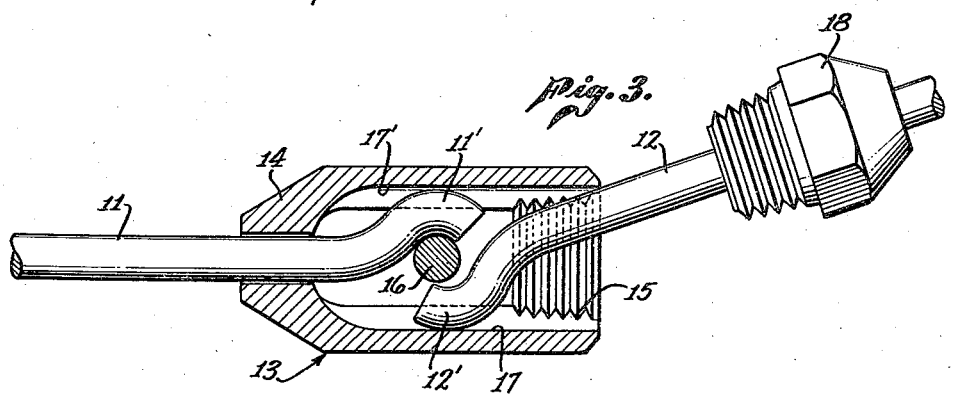
Inventor
PETER R. BETZING,
By Frank Calenaham
Attorney Patented Aug. 8, 1939

2,168,759

UNITED STATES PATENT OFFICE 2,168,759

ROD COUPLING

Peter R. Betzing, Los Angeles, Calif.

Application October 24, 1938, Serial No. 236,697

5 Claims. (Cl. 287—104)

This invention relates to couplings, particularly rod couplings. The invention is particularly designed to provide a coupling for rods having small diameter such as are used as clean-out rods for plumbing.

It is a primary object of this invention to provide a coupling construction for joining various types of rods or the like but which is particularly designed to form a rod coupling for joining clean-out rod debris and stoppages from plumbing. It is an object of this invention to provide such a rod coupling which will withstand the tension, torque and compression stresses to which such clean-out rods are subjected.

It is also an object of this invention to provide a rod coupling which may be easily and quickly assembled or disassembled when desired and, if necessary, without the use of tools.

It is a further object of this invention to provide a rod coupling which will not come apart or permit the accidental separation of the rods when rods are being used in a pipe in a clean-out operation in the event that the threaded members of the coupling should become unscrewed and part.

It is a further object of this invention to provide a rod coupling which is inexpensive to manufacture in which the parts are of durable construction and few in number These and other objects will be apparent from the drawing and description thereof. Referring to the drawing which is for illustrative purposes only;

Fig. 1 is a longitudinal sectional elevation of the coupling of this invention;

Fig. 2 is a transverse section of the coupling taken on the line 2—2 of Fig. 1; and Fig. 3 is a sectional elevation of the main body member of the coupling and an elevation of one rod and the bushing in position prior to assembly.

More particularly describing the invention, reference numeral 11 indicates one of two rods to be joined by the coupling means, while reference numeral 12 indicates the other rod. A thimble or coupling body member 13 is provided which has a reduced apertured end 14 adapted to slidably accommodate the rod 11. The thimble 13 is hollow and is provided with an internally threaded portion 15. Extending transversely of the member 13 and mounted therein in any suitable manner is an anchor pin 16.

Each of the rods 11 and 12 is provided with an offset curved or partially-hooked end portion (11' and 12') which is adapted to extend partially around the anchor pin and engage the anchor pin on the side opposite the main portion of the rod. The thimble 13 is provided with oppositely disposed longitudinally extending grooves 17 and 17' which are adapted to accommodate the offset end portions of the two rods as indicated in Fig. 1.

It is to be understood that the thimble 13 is preferably permanently mounted upon the rod 11 and this is accomplished by first sliding the rod through the thimble until the offset portion 11' enters the thimble in the groove 17' and occupies the position in which it is shown in the drawing. The pin 16 is then secured in place in any suitable manner thereby securing the rod and thimble to prevent relative movement of the two parts. It is not essential to the invention that the thimble and rod 11 be secured together as shown and any suitable means might be employed for this purpose.

When it is desired to couple the rod 12 to the rod 11 this is accomplished by inserting the end 12' of the rod 12 into the thimble by sliding the end in the groove 17 and at the same time maintaining the rod out of alignment with rod 11 and at a substantial angle thereto as shown in Fig. 3. In this position the offset and partially hooked end portion 12' of the rod may be inserted past the anchor pin. The rod 12 is then aligned with the rod 11 and a bushing 18, which is slidably mounted on the rod 12, is threaded into the threaded portion 15 of the thimble 13 serving to maintain the rod 12 in alignment and secure the same in the thimble.

It should be apparent that when the rod 12 is in alignment with the rod 11 or disposed at only a slight angle to the coupling the offset end portion of the rod will engage the side of the anchor pin opposite to that on which the main body of the rod lies and thereby prevent the separation of the rod 12 and the member 13. In this connection it should be apparent that if the bushing 18 becomes unscrewed from member 13 when the coupling is being used in a sectional clean-out rod for the operation of cleaning out pipes the coupling will not come apart for the reason that the rod sections are usually made in at least five foot length sections and that in the diameter pipe in which such clean-out sections are used it is impossible for the rod to become sufficiently angularly offset with relation to the coupling to permit the offset end of the rod to pass the anchor pin.

Although a particular form of the invention has been shown and described it is contemplated that certain changes might be made without departing from the scope of the invention and it is intended to cover such changes and modifications as come within the scope of the claims.

I claim as my invention:

1. A rod coupling comprising a rod; a coupling thimble mounted on the end of said rod; a pin rigidly mounted in said thimble transversely thereof; a second rod having an offset end portion within said thimble engaging said pin on the side of said pin opposite to the main portion of the rod and means cooperating with said thimble for holding said second rod in alignment with said first mentioned rod.

2. A rod coupling comprising: a rod; a thimble mounted on the end of said rod, said thimble having an internally threaded end portion; a pin rigidly mounted in said thimble transversely thereof; a second rod having an offset end portion engaging said pin on the side of said pin opposite to the main portion of the rod; said pin and said thimble cooperating to provide sufficient clearance for the end portion of said second rod to pass said pin only when said second rod is disposed at a substantial angle to the longitudinal axis of said thimble; and a bushing on said second rod threadably engaging the threaded end portion of said thimble and serving to hold said second rod in substantial alignment with said first rod.

3. A rod coupling comprising: a rod; a thimble mounted on the end of said rod, said thimble having an internally threaded end portion and having an internal longitudinal groove; an anchor pin rigidly mounted in said thimble transversely thereof; a second rod having an offset end portion extending into said thimble, the end portion of said rod engaging said groove and engaging said pin on the side of said pin opposite to the main portion of the rod; said groove and said pin providing sufficient clearance for the end portion of said second rod to pass said pin only when said second rod is disposed at a substantial angle to the longitudinal axis of said thimble; and a bushing on said second rod threaded into said thimble and adapted to align said second rod with said first mentioned rod.

4. A rod coupling comprising: a rod; a thimble mounted on the end of said rod, said thimble having an internally threaded end portion and having an internal longitudinal groove; an anchor pin rigidly mounted in said thimble transversely thereof; a second rod having an offset end portion extending into said thimble, the end portion of said rod engaging said groove and engaging said pin on the side of said pin opposite to the main portion of the rod, the offset end portion of said second rod being so formed as to permit insertion and removal of same past said pin only when said second rod is disposed at a substantial angle to the longitudinal axis of said thimble; and a bushing on said second rod threaded into said thimble and adapted to align said second rod with said first mentioned rod.

5. A rod coupling comprising: a rod having an offset partially hooked end portion; a second rod having an offset partially hooked end portion; a thimble adapted to accommodate said ends of said rods, said thimble having two oppositely disposed internal grooves; an anchor pin rigidly mounted in said thimble transversely thereof; the ends of said rods extending into respective grooves and respectively engaging said pin on the side of said pin opposite to the main portion of the respective rods; and detachable means cooperating with said thimble for holding said second rod in alignment with the longitudinal axis of said thimble; said thimble being adapted to hold said first mentioned rod in alignment with the longitudinal axis of said thimble.

PETER R. BETZING.